United States Patent [19]
Richardson

[11] Patent Number: 5,400,863
[45] Date of Patent: Mar. 28, 1995

[54] AIR DUCT AND FURNACE CLEANING SYSTEM AND METHOD

[76] Inventor: Paul A. Richardson, 124 Forest Rd., Salisbury, Mass. 01952

[21] Appl. No.: 45,415

[22] Filed: Apr. 9, 1993

[51] Int. Cl.⁶ .............................. A47L 9/00; F23J 1/02
[52] U.S. Cl. ........................................ 180/53.4; 15/314; 60/432; 60/469; 97/136; 180/53.8; 296/26
[58] Field of Search ............... 180/53.4, 53.8; 296/26; 242/86, 86.2; 15/314; 60/468, 469 XC, 432 XC; 92/136

[56] References Cited

U.S. PATENT DOCUMENTS

| | | | |
|---|---|---|---|
| 2,315,639 | 4/1943 | Monahan | 242/86.2 |
| 3,585,788 | 6/1971 | Wilson | 15/314 |
| 4,887,860 | 12/1989 | Dowty | 296/26 |
| 5,088,785 | 2/1992 | Lee | 296/26 |

FOREIGN PATENT DOCUMENTS

| | | | |
|---|---|---|---|
| 495664 | 7/1992 | European Pat. Off. | 296/26 |
| 3828184 | 3/1990 | Germany | 296/26 |

OTHER PUBLICATIONS

Cleanfax May/Jun. 1992 advertisement.

Primary Examiner—Eric D. Culbreth
Attorney, Agent, or Firm—Nields & Lemack

[57] ABSTRACT

A power vacuum truck having a movable roof to accommodate expanding vacuum bags, and a method of raising the roof are disclosed. The power vacuum truck utilizes a hydraulic pump to drive a fan and compressor in order to eliminate mechanical linkages and the concomitant breakdown and maintenance associated therewith, and eliminates holes in the roof previously necessary to accommodate the expandable vacuum bags. An vehicle having an automatic transmission can be used.

10 Claims, 9 Drawing Sheets

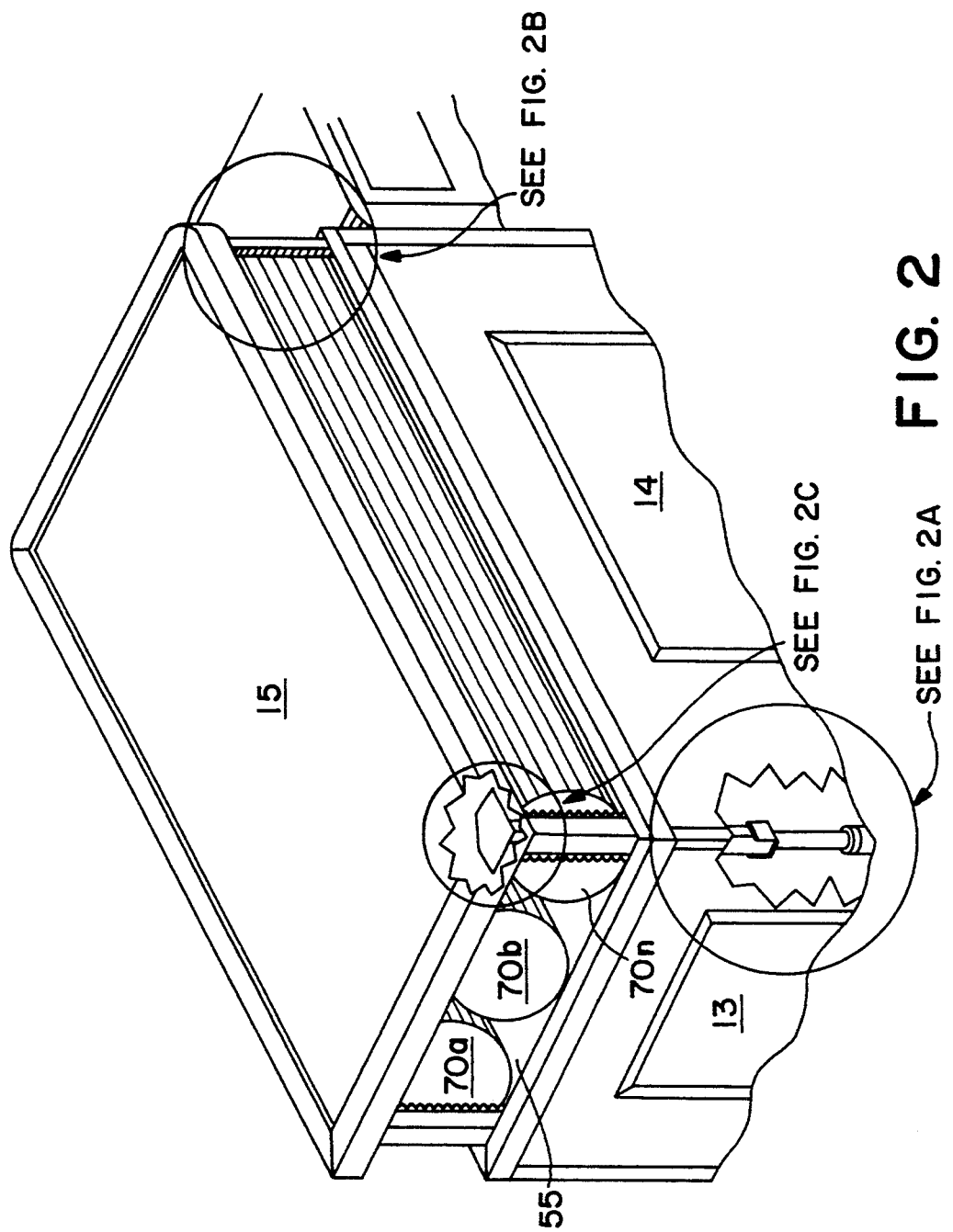

AIR DUCT AND FURNACE CLEANING SYSTEM AND METHOD

BACKGROUND OF THE INVENTION

Conventional power vacuum trucks for cleaning air ducts, furnaces and the like utilize a plurality of expandable bags to collect debris removed. To that end, the rigid, closed truck roof is formed with a corresponding plurality of holes through which the bags expand upon inflation. Once deflated, the bags retreat into the truck compartment, but remain exposed to the environment in view of the plurality of holes in the truck roof. Typically a tarpaulin with grommet fasteners and hooks is used to cover the roof during transit and storage of the truck in order to protect the equipment in the truck compartment. A ratchet-type tarp roll-up mechanism can be provided to assist in rolling up the tarpaulin after vacuum operation.

These conventional power vacuum trucks require truck personnel to ascend onto the truck roof to remove the tarpaulin during job set-up, and again to replace the tarpaulin during job tear-down. This poses an obvious danger to the truck personnel, and is uneconomical in view of the time required for the set-up and tear-down operations.

In addition, conventional power vacuum trucks operate from a power take off (PTO) through a series of mechanical linkages (shafts, pillow blocks, universals, etc.) that are susceptible to breakdown and that require costly repairs and maintenance, and that require standard transmissions.

It would therefore be highly desirable to provide a power vacuum truck where the need for the operator to climb onto the roof to set-up and tear-down is eliminated, and where the mechanical linkages of the power take off operation are replaced with a more efficient and economical system.

SUMMARY OF THE INVENTION

The problems of the prior art have been solved by the instant invention, which provides a power vacuum truck having a moveable roof to accommodate expanding vacuum bags, thereby eliminating the holes in the roof and the concomitant need for the operator to climb onto the roof of the truck. In addition, the power vacuum truck of the instant invention utilizes a hydraulic pump to drive the fan and compressor in order to eliminate mechanical linkages and the concomitant breakdown and maintenance associated therewith. An automatic transmission can be used.

In its method aspects, the present invention provides a method of raising a truck roof pneumatically.

These and other features of the present invention will become more apparent upon reference to the following drawings and detailed description.

BRIEF DESCRIPTION OF THE DRAWINGS

FIG. 2 is a perspective view of the truck roof in an open position in accordance with the present invention;

DETAILED DESCRIPTION OF THE INVENTION

Figure 1:
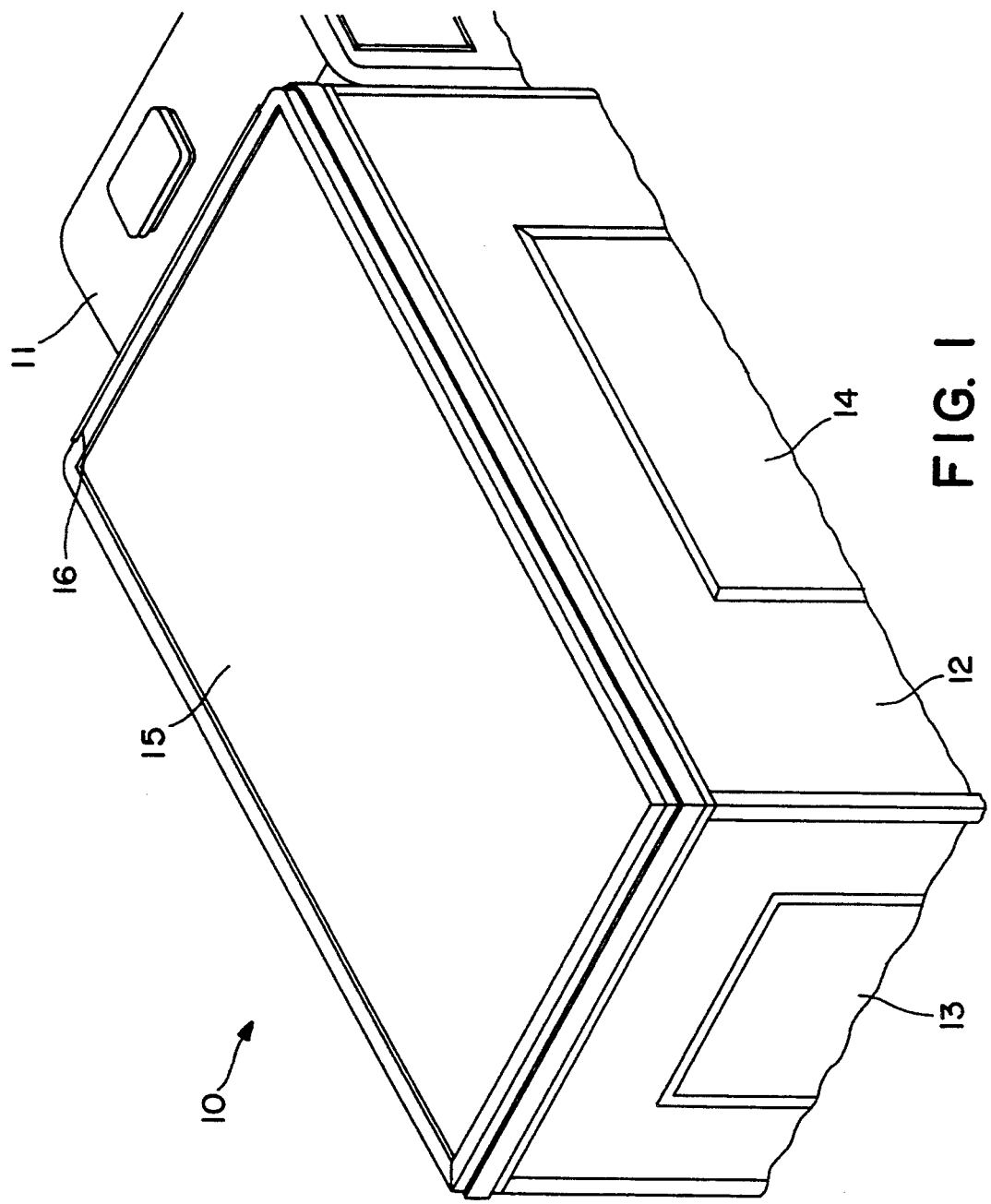
FIG. 1 is a perspective view of the truck roof in a closed position in accordance with the present invention.

Turning now to FIG. 1, there is partially shown a power vacuum truck 10 having a cab 11 and main body 12 with a roof 15 and with a rear access door 13 and side access doors 14 (only one shown) providing easy accessibility to the main body interior. An optional spoiler 16 exerts a downward force to prevent the roof from rising while the vehicle is in motion, especially when the roof is not locked in place. Preferably the truck 10 interior body frame is pre-painted $\frac{1}{4}''$ structural steel, with a heavy-duty aluminum floor. Suitable body dimensions are $80''W \times 143''L \times 120''H$ (ground to lowered roof).

FIG. 2 shows the roof 15 raised to its open position for vacuum operation. The roof must raise to a height sufficient to accommodate the expandable vacuum bags 70a–70n (shown schematically in FIG. 2) resting on platform 55, such height typically being a maximum of about twenty-two (22) inches. The present inventor has found that three expandable bags placed side-by-side and extending the length of the main body 12 when in the inflated state are suitable. Preferably the roof and systems exterior is aluminum and stainless steel.

Figure 2A:
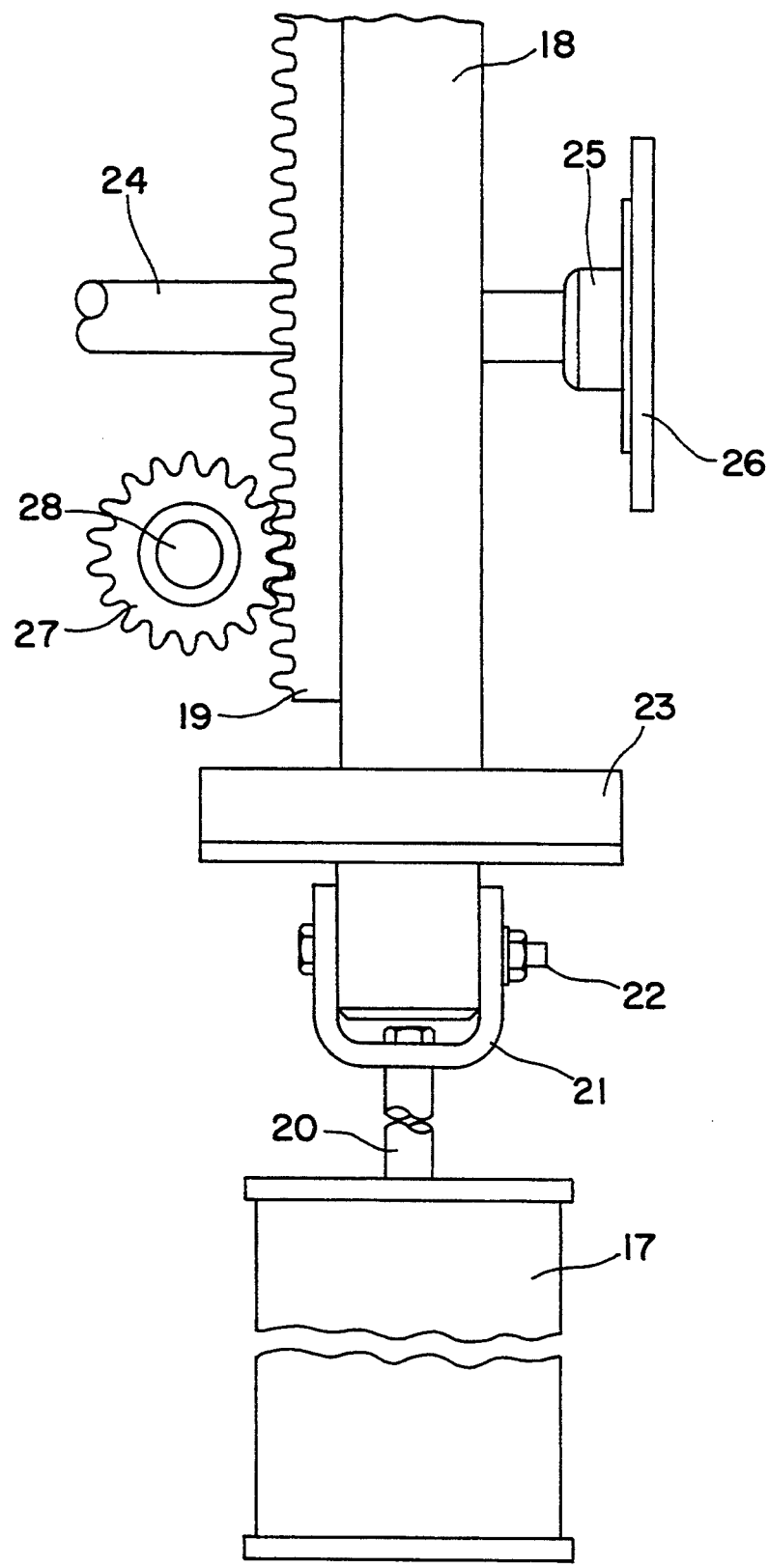
FIG. 2A is a detailed view of the truck roof rear right corner lift mechanism in accordance with the present invention.

FIG. 2A shows in greater detail the truck roof lifting mechanism used in the rear right corner of main body 12 of truck 10. The mechanism is typical of that present in each corner of the main body 12, except only one air cylinder is necessary to lift all four roof supporting posts, as will become apparent hereinafter. An air cylinder 17 preferably having a 7-1 power factor drives roof support post 18 having rack 19 mounted thereon. The arm 20 of air cylinder 17 is coupled to post 18 via U-mount 21, which in turn is coupled to post 18 with a nut and bolt assembly 22 as shown. A spur gear 27 having shaft 28 extending therethrough to the opposing right front corner gear of the roof lift mechanism in main body 12 is engaged in rack 19, and rotates as the roof support post 18 moves up and down. This rotation causes rotation of shaft 28, which in turn causes rotation of a corresponding spur gear 27' (FIG. 2B) at the opposing front right corner, thereby causing up and down movement of the opposing roof support posts in time with the right rear roof support post 18. A second shaft 24 coupled to bearing 25 and mounting bracket 26 is coupled to another spur gear (not shown) and engaged with a second rack (not shown) and extends to the opposing left rear roof lift mechanism in the main body 12 and functions to move the left rear roof support post up and down in time with post 18. A third shaft 24' (FIG. 2B) is similarly connected between the right front and left front roof support posts to cause the left front roof support post to move in time with the right front roof support post, and therefore with the right rear support post 18.

Figure 6:
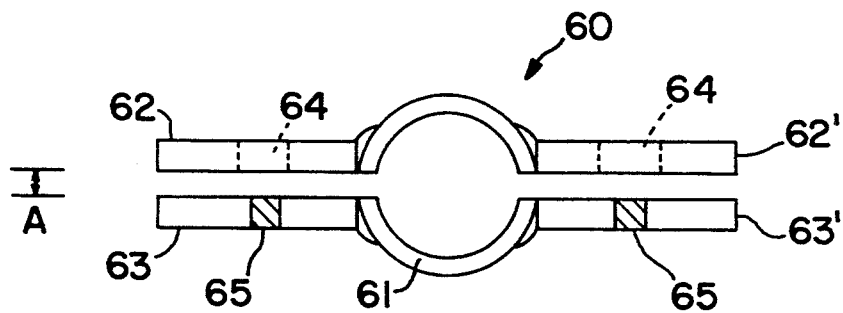
FIG. 6 is a cross-sectional view of the connector used in accordance with the present invention.

With reference to FIG. 6, the center of each of the three shafts are separated and reconnected together by means of a connector 60 so that timing can be set to allow each post to be parallel with each other. The connector 60 includes a central pipe 61 having an inner diameter substantially corresponding to the outer diameter of the shafts, so that the shafts are received in the pipe 61. An inner diameter of $\frac{5}{8}''$ has been found to be suitable. The pipe is cut into a semi-circular cross-sectional configuration to form a $\frac{1}{4}''$ gap A as shown, and two top extensions 62, 62' are secured (such as by welding) to the top portion of pipe 61, and two bottom extensions 63, 63' are similarly secured to the bottom portion of pipe 61. Top extensions 62, 62' have a plurality of clearance holes 64 (9/16") to receive a plurality of bolts (not shown), and bottom extensions 63, 63' have a corresponding plurality of tapped holes 65 ($\frac{3}{8}''$) aligned with said clearance holes to secure the bolts and compress the connector upon the shafts when the bolts are tightened. Pipe 61 is preferably about 12 inches long, and extensions 62, 62' and 63, 63' are preferably $1'' \times \frac{1}{4}'' \times 12''$. When the roof is in its lowered position, the bolts are loosened, allowing the shafts inside pipe 61 to move freely therein. Once in the lowered position, the bolts are tightened in order to lock the shafts in position so that the posts are parallel and therefore timed appropriately upon lifting the roof. The three shafts are supported by bushings which allow rotation of the shaft while maintaining proper spur engagement.

A pair of mounting block guides and brackets 23 (only one shown) are provided to minimize horizontal movement while providing minimum friction to the vertical movement of the stainless steel roof support post 18, one preferably as shown between the air cylinder arm 20 and rack 19, and the other above shaft 24 before the post meets the roof 15. Preferably these guide supports are formed of polyethylene, and are machined to accommodate the diameter of post 18 (1.5 inches) and the rack 19. As will be readily apparent from the foregoing, right rear and right front roof supporting posts each have a pair of racks, whereas only one rack is necessary on left rear and left front roof supporting posts.

Figure 2B:
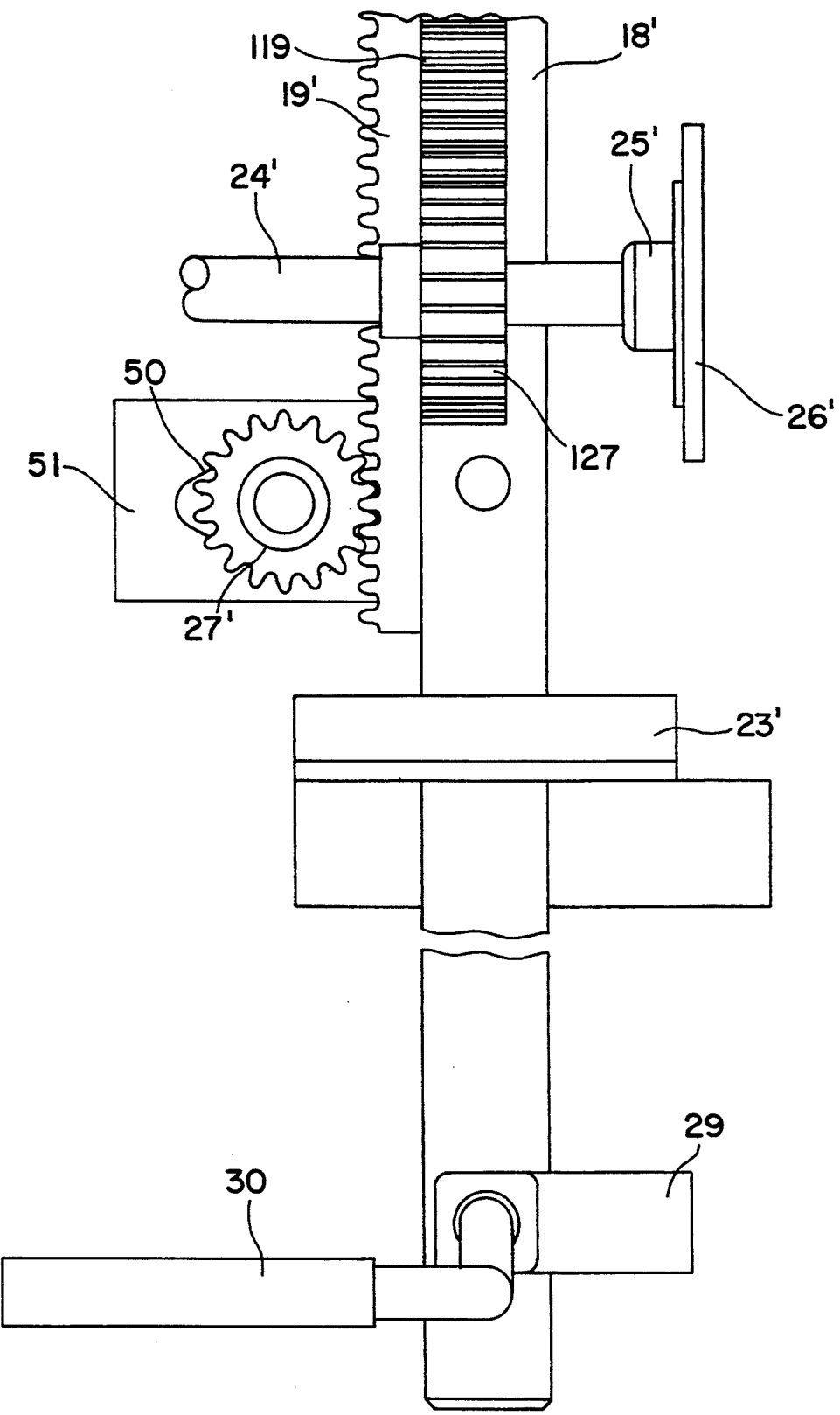
FIG. 2B is a detailed view of the truck roof front right corner lift mechanism in accordance with the present invention.

FIG. 2B shows in greater detail the truck roof lifting mechanism used in the front right corner of main body 12 of truck 10. Roof lifting post 18' is provided at its lower end with a locking mechanism including a mounting bracket 29 and lock 30 for securing the roof in its down position. The position of the locking mechanism is monitored by an electrical switch which disallows the system to be operated while the roof is locked. Rack 19' engages spur 27' (shown with bearing 50 and bearing mounting bracket 51) as in FIG. 2B. Rack 119 is also shown engaged with spur gear 127 for movement of shaft 24'.

Figure 2C:
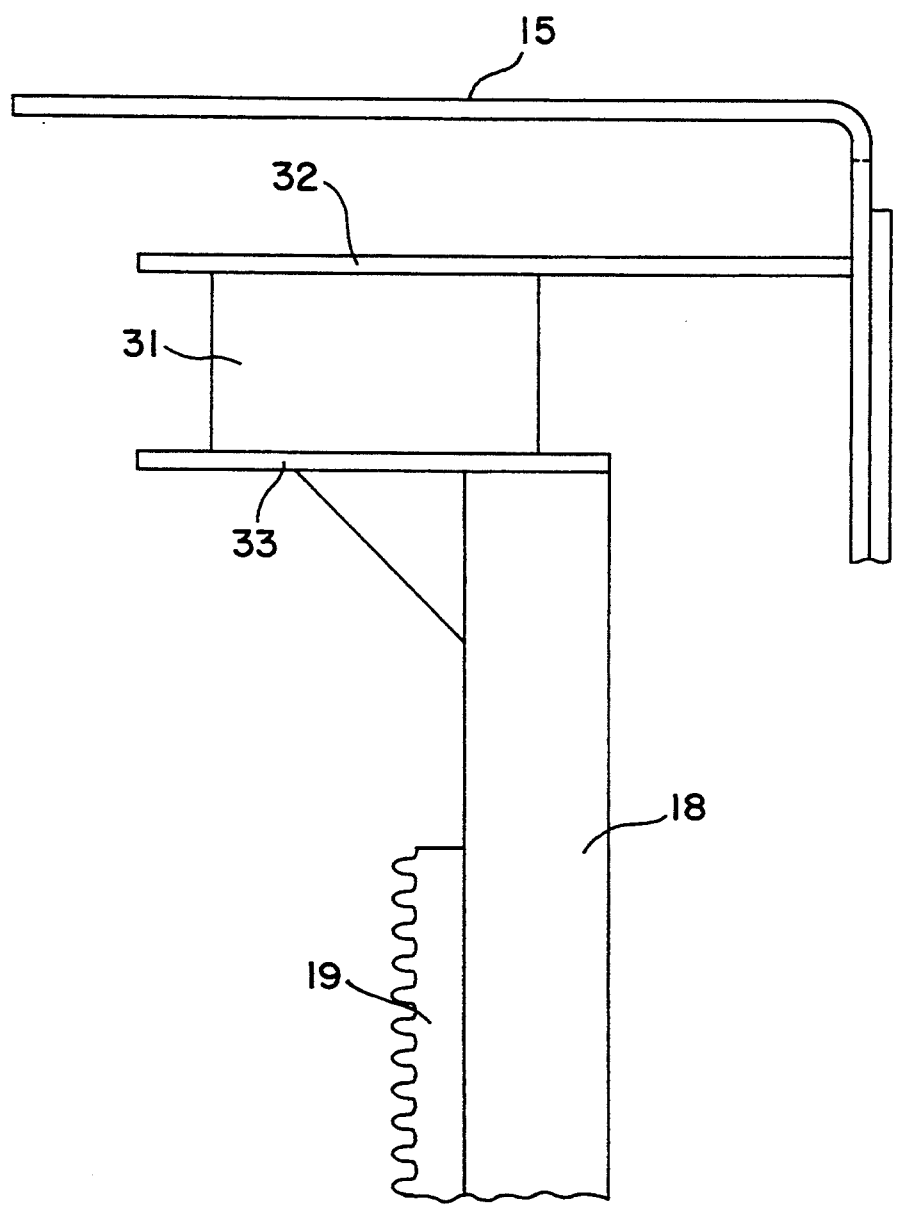
FIG. 2C is a detailed view of a portion of the truck roof lift mechanism common to all roof corners in accordance with the present invention.

FIG. 2C illustrates the attachment of the roof 15 to the post 18. Rubber engine mount 31 sits between upper engine mount plate 32 coupled to roof 15 and lower engine mount plate 33 coupled to post 18 to allow for slight horizontal movement between the roof and posts, which prevents the four posts from binding in the event of a slight misalignment.

Figure 3A:
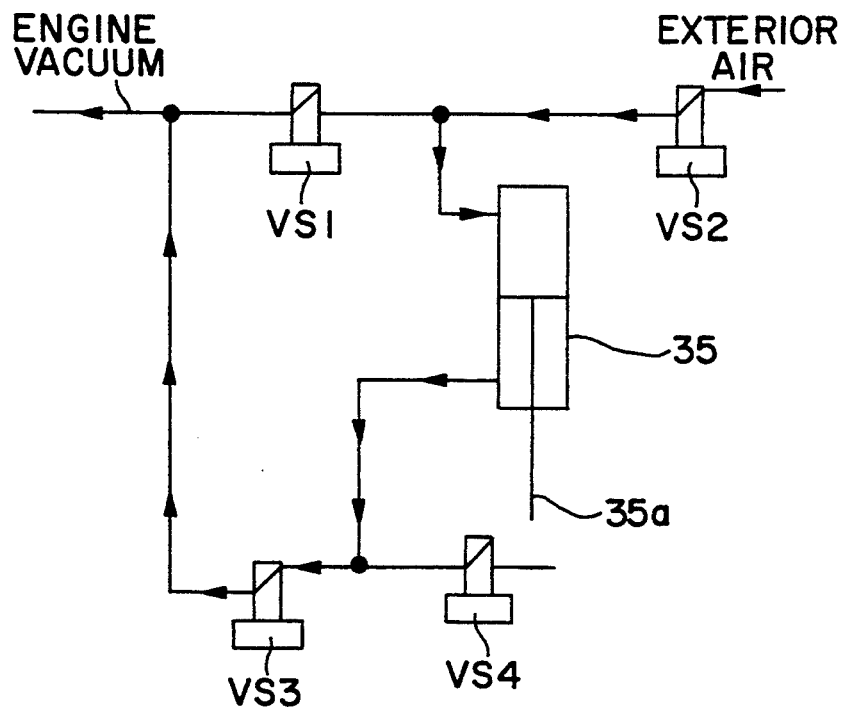
FIGS. 3A and 3B are schematics of the vacuum system in accordance with the present invention.
Figure 3B:
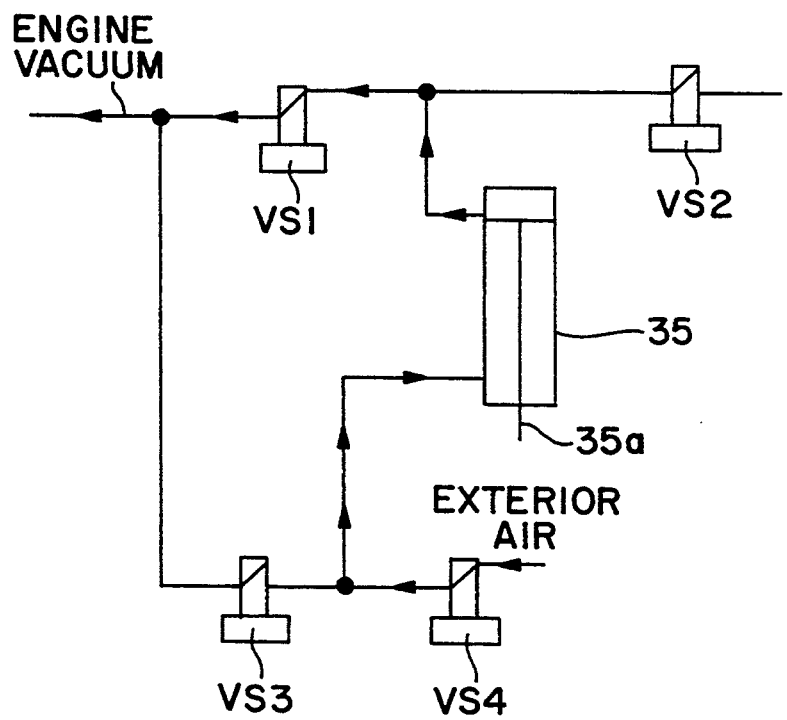
Figure 4A:
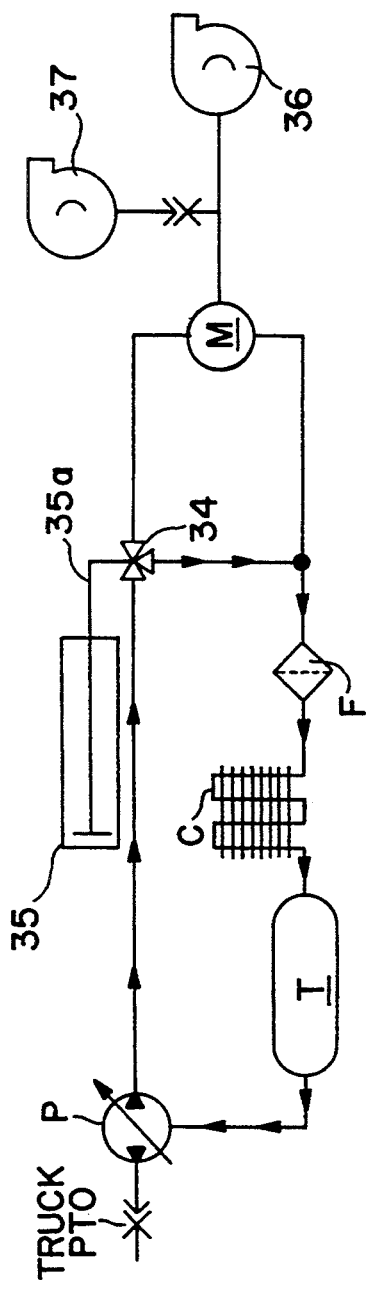
FIGS. 4A and 4B are schematics of the hydraulic system in accordance with the present invention.
Figure 4B:
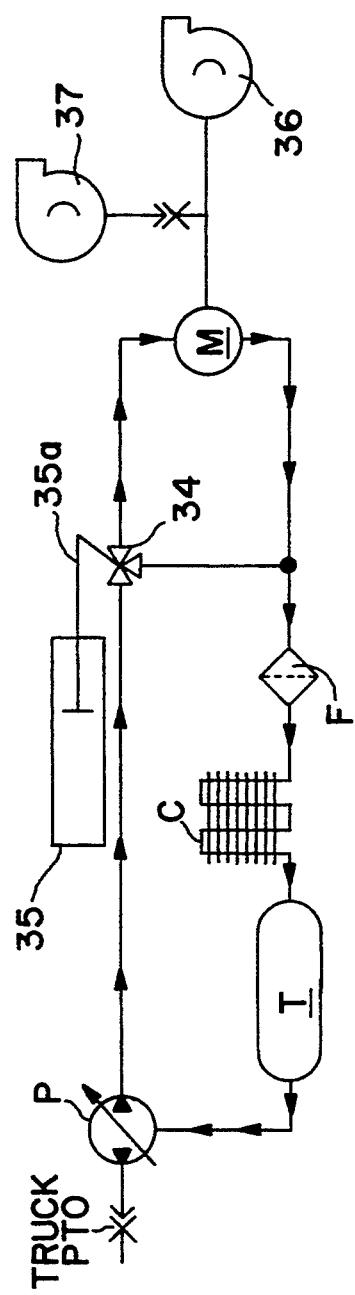

The heart of the duct cleaning system is a large fan which produced air flow in excess of about 8000 cfm and a compressor, both of which are driven by a hydraulic pump P and motor M, as shown in FIGS. 4A and 4B. An in-line bypass valve 34 is regulated by a vacuum created by the vehicle engine. With reference to FIGS. 3A and 3B a vacuum line from the engine is tapped and pulls a vacuum on vacuum cylinder 35 through open solenoid VS3 as shown in FIG. 3A (in this mode, solenoids VS1 and VS4 are closed, and solenoid VS2 is open to the ambient). This causes the vacuum cylinder arm 35a, which is mechanically coupled to the bypass valve 34, to extend and move the bypass valve into the off position as shown in FIG. 4A. With the bypass valve in the off position, the hydraulic fluid bypasses the motor M and flows through the filter F, condenser C, and overflow tank T and loops back to the hydraulic pump P.

As the vacuum system is activated, the solenoids VS1 and VS4 are opened and solenoids VS2 and VS3 are closed (FIG. 3B), thereby causing vacuum cylinder arm 35a to retract. The bypass valve is thus slowly turned on, which diverts the total flow of hydraulic fluid and power to the motor M, thus powering the fan 36 and the air compressor 37, as shown in FIG. 4B. The speed at which this happens allows the system to turn be turned on gradually, thus preventing damage to the system components.

The hydraulic pump P is in turn driven by a power take off operated off the truck 10 transmission. When the power take off is engaged, power is transferred to the hydraulic pump P, which causes fluid to flow through the hydraulic system. When the power take off is disengaged, the hydraulic pump stops and the fan slowly comes to a stop as the fluid reverses the flow through the motor M. This prevents damage to the system when power is disengaged by allowing the fan to free wheel.

To raise the roof 15, the vacuum system is operated to open the bypass valve 34 and power the hydraulic motor M, and compressed air from compressor 37 is supplied to the lower port of air cylinder 17 causing the air cylinder arm 20 to extend with a force seven times the input pressure against the support post 18. When the upward force of the air cylinder arm 20 exceeds the downward force due to the weight of the roof and friction loss in the gear drive, the arm 20 will extend and raise the roof. The right rear post 18 will raise until the air supplied to the cylinder is stopped or until it reaches it maximum travel of about twenty-two inches.

Figure 5A:
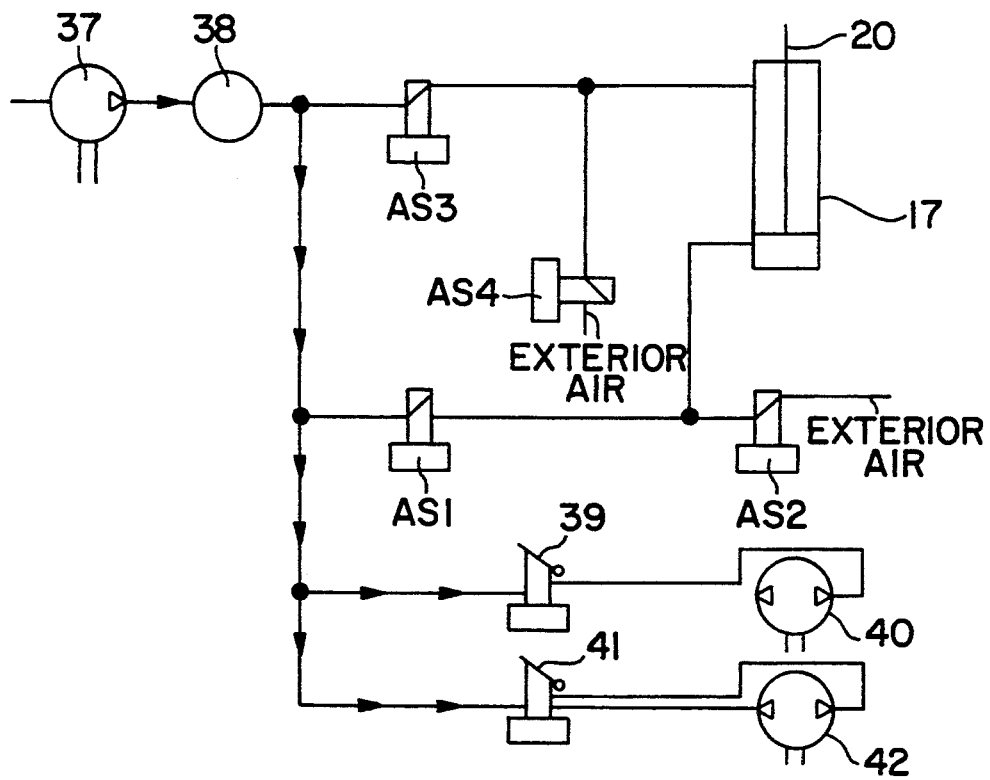
FIGS. 5A–5C are schematic views of the air line system in accordance with the present invention.
Figure 5B:
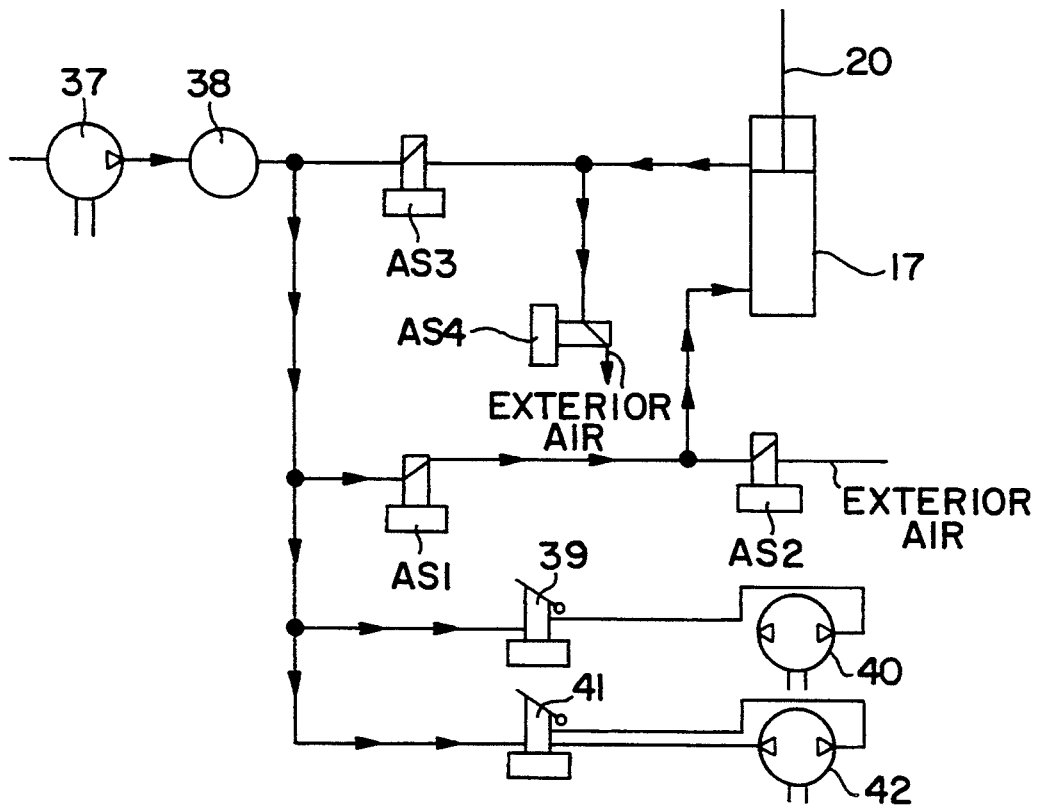

With reference to FIG. 5A, an air compressor 37 capable of delivering up to about 200 psi of air pressure, such as a Quincy 325-S compressor with constant run bypass head and a 30 gallon air tank provides compressed air through air receiver 38 to the air cylinder 17 to raise and to lower the roof 15. When the system is in the normal or off position of FIG. 5A, all of the solenoids are closed, and the roof remains in the position set when the solenoids were deactivated. (Compressed air from the air compressor also can be independently fed through a lever reel valve 39 to an air motor 40 to drive the small air hose reel, and through a lever reel valve 41 to an air motor 42 to drive the large vacuum hose reel, as discussed in more detail below.) FIG. 5B shows the schematic when the roof is active or fully raised. When the roof is raised, only solenoids AS1 and AS4 open, allowing compressed air to flow to the air cylinder as shown, thereby causing air cylinder arm 20 to extend. When power to solenoids AS1 and AS4 is discontinued, the air is locked in the system and holds the roof in position.

Figure 5C:
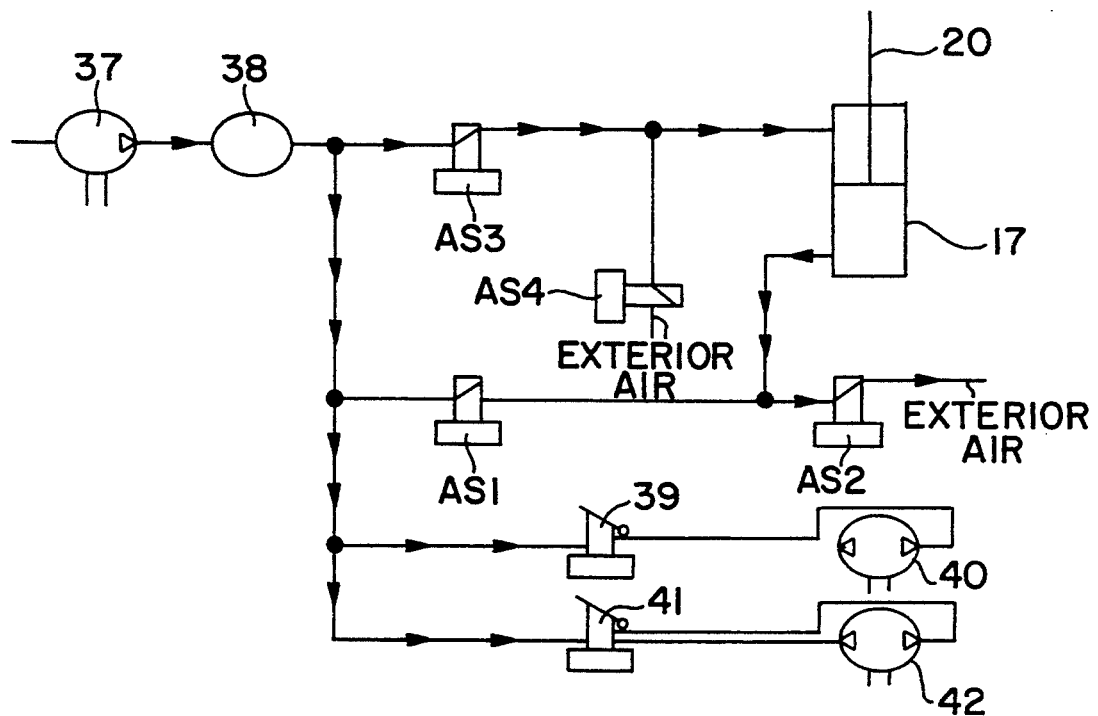

In the roof lowering condition as illustrated in FIG. 5C, power is applied to solenoids AS2 and AS3 while solenoids AS1 and AS4 remain in the closed position. In this way, air retracts the rod of the air cylinder and causes the roof to lower.

The power vacuum assembly includes conventional elements, such as a vacuum hose and air hose mounted on respective reels. The air hose is used to agitate debris in the duct being cleaned. Preferably the reels are powered-assisted by the compressor 37 as shown in FIGS. 5A, 5B and 5C. The vacuum reel preferably has a 150 foot capacity for 10 inch hose. The air reel preferably has an active swivel and a capacity of 300 feet for ⅜ inch hose. The vacuum hose is in communication with a large fan 36 via suitable ducting that can be conveniently placed under the truck floor. The vacuum bags rest on an aluminum platform below roof 15. The platform has a plurality of holes allowing for communication with air from the fan via an expanded duct or air tank. This expanded duct slows the air from the fan and allows dust to collect on a tray positioned at the bottom of the duct. The fan 36 is preferably a closed face eight blade (10"W×40" diameter) steel fan and housing with an easy access fan housing cover and balanced wheel assembly.

The operation of all of the elements of the instant power vacuum truck is automated and managed by a readily accessible control panel in the main body 12. In operation, the following procedure is followed:

1. The transmission shift selector is positioned to "Neutral" for standard transmissions and "Park" for automatic transmissions.
2. The vehicle emergency brake is engaged and chock blocks are placed at the rear tires.
3. The rear system access door 13 is opened, and the necessary length of vacuum hose is removed from the reel and connected to the area requiring cleaning.
4. The small vacuum intake door is opened and the hose is attached to the connector.
5. The necessary length of air hose is removed from the reel and run to the area requiring cleaning.
6. The vehicle engine is started, and the clutch pedal is depressed on standard transmission vehicles. The power take off know is pulled fully (a red light illuminates) and, in standard transmission vehicles, the clutch is slowly disengaged.
7. Right access door 14 is opened and the roof locking mechanism is unlocked. The "Main Power" key is turned to the on position.
8. The roof is raised by holding the "Roof Level" switch in the "Up" position until the roof is fully raised and the "Up" light illuminates. If the system air pressure is inadequate, proceed to the next step and raise the roof after the system builds up sufficient pressure.
9. The fan is turned on by depressing the "Fan" switch to the "On" position, causing the vacuum bags to inflate and expand.
10. The cleaning tasks are performed.
11. The fan is shut off by placing the "Fan" switch to the "Off" position.
12. After the vacuum bags have fully deflated, the "Roof Level" switch is held in the "Down" position until the roof is fully lowered and the "Down" light illuminates.
13. The "Main Power" key is turned to the "Off" position, and the roof is locked with the roof locking mechanism.
14. In standard transmission vehicles, the clutch pedal is depressed. The power take off knob is fully pushed in until the red light is no longer illuminated.
15. The air and vacuum hoses are rewound onto their respective reels, the chock blocks are removed and all doors secured.

What is claimed is:

1. A power vacuum truck comprising:
    a truck having a cab and a main body with expandable vacuum bags disposed in said main body, said main body including a roof;
    means in said truck for pneumatically raising said roof to accommodate said expandable vacuum bags in their expanded condition, said means comprising an air cylinder having an air cylinder arm coupled to a first roof supporting post having first and second racks thereon, said first rack engaging a first gear coupled to a first shaft extending to a second gear engaging a third rack on a second roof supporting post, said second rack engaging a third gear coupled to a second shaft, said second shaft extending to a fourth gear engaging a fourth rack on a third roof supporting post, said third roof supporting post also having a fifth rack engaging a fifth gear coupled to a third shaft extending to and engaging a sixth rack on a fourth roof supporting post via a sixth gear; and
    means in said truck for pneumatically lowering said roof to a closed position when said expandable vacuum bags are deflated.

2. The power vacuum truck of claim 1 wherein said air cylinder arm is extended or retracted as a result of pressure in said air cylinder supplied from a compressor housed in said truck.

3. The power vacuum truck of claim 2 wherein said compressor is driven by a hydraulic motor in said truck.

4. The power truck of claim 3 wherein said truck includes a transmission, and wherein said transmission has power take off, and wherein said hydraulic motor is driven by said power take off.

5. The power vacuum truck of claim 4 wherein said truck transmission is automatic.

6. The power vacuum truck of claim 1, wherein each of said shafts is separated into two portions and reconnected via a connector, said connector comprising a hollow pipe for receiving each of said portions and means for securing said pipe about said portions so as to lock said portions in place in said connector.

7. The power vacuum truck of claim 1, further comprising a fan in communication with a vacuum hose in said main body for supplying vacuum to said vacuum hose.

8. The power vacuum truck of claim 7, wherein said vacuum hose is wound on a reel having an air motor, and wherein said main body of said truck further comprises a hydraulic motor and a compressor driven by said hydraulic motor, said compressor supplying compressed air to said air motor to rotate said reel and wind or unwind said hose.

9. A method of raising the roof of a power vacuum truck having an air cylinder having an arm, a hydraulic pump, a hydraulic motor, a compressor driven thereby and a vacuum cylinder coupled to a bypass valve, said bypass valve regulating the flow of hydraulic fluid from said hydraulic pump to said hydraulic motor in that when said bypass valve is in a first position, hydraulic fluid bypasses said motor, and when said bypass valve is in a second position, hydraulic fluid flows to said motor to drive said compressor, comprising:

activating said vacuum cylinder so as to cause said bypass valve to be in said second position; and supplying compressed air from said compressor to said air cylinder so as to move said air cylinder arm and thereby raise said roof.

10. The method of claim 9 wherein said power vacuum truck comprises a first roof supporting post coupled to said cylinder arm and having first and second racks thereon, said first rack engaging a first gear coupled to a first shaft extending to a second gear engaging a third rack on a second roof supporting post, said second rack engaging a third gear coupled to a second shaft, said second shaft extending to a fourth gear engaging a fourth rack on a third roof supporting post, said third roof supporting post also having a fifth rack engaging a fifth gear coupled to a third shaft extending to and engaging a sixth rack on a fourth roof supporting post via a sixth gear.

* * * * *